(12) United States Patent
Reagan et al.

(10) Patent No.: US 7,623,749 B2
(45) Date of Patent: Nov. 24, 2009

(54) FIBER DISTRIBUTION HUB WITH MODULAR TERMINATION BLOCKS

(75) Inventors: Randy Reagan, Clinton, MA (US); Keith Millea, Sutton, MA (US); Tom Leblanc, Fitchburg, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/513,910

(22) Filed: Aug. 30, 2006

(65) Prior Publication Data

US 2007/0165995 A1    Jul. 19, 2007

Related U.S. Application Data

(60) Provisional application No. 60/712,147, filed on Aug. 30, 2005.

(51) Int. Cl.
*G02B 6/00*    (2006.01)
(52) U.S. Cl. .......................... 385/135; 385/70
(58) Field of Classification Search ............. 385/135, 385/70, 134, 13, 5, 139, 2, 27, 37, 129
See application file for complete search history.

(56) References Cited

U.S. PATENT DOCUMENTS

| | | | |
|---|---|---|---|
| 4,736,100 A | 4/1988 | Vastagh | |
| 4,747,020 A | 5/1988 | Brickley et al. | |
| 4,792,203 A | 12/1988 | Nelson et al. | |
| 4,824,196 A | 4/1989 | Bylander | |
| 4,861,134 A | 8/1989 | Alameel et al. | |
| 4,900,123 A | 2/1990 | Barlow et al. | |
| 4,948,220 A | 8/1990 | Violo et al. | |
| 4,995,688 A | 2/1991 | Anton et al. | |
| 5,023,646 A | 6/1991 | Ishida et al. | |
| 5,069,636 A | 12/1991 | Shimirak et al. | |
| 5,073,042 A | 12/1991 | Mulholland et al. | |
| 5,076,688 A | 12/1991 | Bowen et al. | |
| 5,142,598 A | 8/1992 | Tabone | |
| 5,214,730 A | 5/1993 | Nagasawa et al. | |
| 5,214,735 A | 5/1993 | Henneberger et al. | |
| 5,233,674 A | 8/1993 | Vladic | |
| 5,274,729 A | 12/1993 | King et al. | |
| 5,274,731 A | 12/1993 | White | |

(Continued)

FOREIGN PATENT DOCUMENTS

EP    0 788 002 A1    8/1997

(Continued)

OTHER PUBLICATIONS

U.S. Appl. No. 11/544,951, filed Oct. 6, 2006.

(Continued)

*Primary Examiner*—Ellen Kim
(74) *Attorney, Agent, or Firm*—Merchant & Gould P.C.

(57) ABSTRACT

A fiber distribution hub includes a cabinet; a termination region positioned within the interior of the cabinet; at least one termination module mounted in at least one opening defined at the termination region; fiber optic connectors coupled to termination adapters of the termination module; intermediate fibers extending rearwardly of the fiber optic connectors; and a multi-fiber connector terminating the intermediate fibers. The termination module includes a housing enclosing the termination adapters. One or more termination modules can be incrementally added to the fiber distribution hub.

24 Claims, 13 Drawing Sheets

U.S. PATENT DOCUMENTS

| | | | |
|---|---|---|---|
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,469,526 A | 11/1995 | Rawlings |
| 5,497,444 A | 3/1996 | Wheeler |
| 5,511,144 A | 4/1996 | Hawkins et al. |
| 5,542,015 A | 7/1996 | Hultermans |
| 5,647,043 A | 7/1997 | Anderson et al. |
| 5,708,751 A | 1/1998 | Mattei |
| 5,717,810 A | 2/1998 | Wheeler |
| 5,734,774 A | 3/1998 | Morrell |
| 5,734,776 A | 3/1998 | Puetz |
| 5,758,003 A | 5/1998 | Wheeler et al. |
| 5,764,844 A | 6/1998 | Mendes |
| 5,774,612 A | 6/1998 | Belenkiy et al. |
| 5,823,646 A | 10/1998 | Arizpe et al. |
| 5,825,955 A | 10/1998 | Ernst et al. |
| 5,867,621 A | 2/1999 | Luther et al. |
| 5,883,995 A | 3/1999 | Lu |
| 5,892,870 A | 4/1999 | Fingler et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 6,027,252 A | 2/2000 | Erdman et al. |
| 6,044,193 A | 3/2000 | Szentesi et al. |
| 6,061,492 A | 5/2000 | Strause et al. |
| 6,079,881 A | 6/2000 | Roth |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,271,484 B1 | 8/2001 | Tokutsu |
| 6,278,829 B1 | 8/2001 | BuAbbud et al. |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,483,977 B2 | 11/2002 | Battey et al. |
| 6,496,640 B1 | 12/2002 | Harvey et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,554,485 B1 | 4/2003 | Beatty et al. |
| 6,556,763 B1 | 4/2003 | Puetz et al. |
| 6,577,595 B1 | 6/2003 | Counterman |
| 6,591,051 B2 | 7/2003 | Solheid et al. |
| 6,597,670 B1 | 7/2003 | Tweedy et al. |
| 6,614,980 B1 | 9/2003 | Mahony |
| 6,621,975 B2 | 9/2003 | LaPorte et al. |
| 6,625,375 B1 | 9/2003 | Mahony |
| 6,631,237 B2 | 10/2003 | Knudsen et al. |
| 6,654,536 B2 | 11/2003 | Battey et al. |
| 6,661,961 B1 | 12/2003 | Allen et al. |
| 6,668,127 B1 | 12/2003 | Mahony |
| 6,715,719 B2 | 4/2004 | Nault et al. |
| 6,760,531 B1 | 7/2004 | Solheid et al. |
| 6,778,752 B2 | 8/2004 | LaPorte et al. |
| 6,788,786 B1 | 9/2004 | Kessler et al. |
| 6,792,190 B2 | 9/2004 | Xin et al. |
| 6,792,191 B1 | 9/2004 | Clapp, Jr. et al. |
| 6,815,612 B2 | 11/2004 | Bloodworth et al. |
| 6,845,207 B2 | 1/2005 | Schray |
| 6,850,685 B2 | 2/2005 | Tinucci et al. |
| 6,863,446 B2 | 3/2005 | Ngo |
| 6,870,734 B2 | 3/2005 | Mertesdorf et al. |
| 6,909,833 B2 | 6/2005 | Henschel et al. |
| 6,920,213 B2 | 7/2005 | Pershan |
| 6,920,274 B2 | 7/2005 | Rapp et al. |
| 6,925,241 B2 | 8/2005 | Bohle et al. |
| 6,957,920 B2 | 10/2005 | Luther et al. |
| 6,980,725 B1 | 12/2005 | Swieconek |
| 6,983,095 B2 | 1/2006 | Reagan et al. |
| 7,068,907 B2 | 6/2006 | Schray |
| 7,086,539 B2 | 8/2006 | Knudsen et al. |
| 7,088,899 B2 * | 8/2006 | Reagan et al. ............... 385/135 |
| 7,103,255 B2 | 9/2006 | Reagan et al. |
| 7,139,461 B2 | 11/2006 | Puetz et al. |
| 7,142,764 B2 | 11/2006 | Allen et al. |
| 7,146,089 B2 | 12/2006 | Reagan et al. |
| 7,149,398 B2 | 12/2006 | Solheid et al. |
| 7,171,102 B2 * | 1/2007 | Reagan et al. ............... 385/135 |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,245,809 B1 | 7/2007 | Gniadek et al. |
| 7,277,620 B2 | 10/2007 | Vongseng et al. |
| 7,298,952 B2 | 11/2007 | Allen et al. |
| 7,333,707 B2 | 2/2008 | Puetz et al. |
| 7,346,254 B2 | 3/2008 | Kramer et al. |
| 7,369,741 B2 | 5/2008 | Reagan et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,400,816 B2 | 7/2008 | Reagan et al. |
| 7,407,330 B2 | 8/2008 | Smith et al. |
| 7,416,349 B2 | 8/2008 | Kramer |
| 7,418,181 B2 | 8/2008 | Zimmel et al. |
| 7,419,384 B2 | 9/2008 | Neumetzler et al. |
| 7,457,503 B2 | 11/2008 | Solheid et al. |
| 7,460,759 B2 | 12/2008 | Reagan et al. |
| 7,471,869 B2 | 12/2008 | Reagan et al. |
| 7,492,575 B2 | 2/2009 | Irmer et al. |
| 7,515,805 B2 | 4/2009 | Vonseng et al. |
| 7,519,259 B2 | 4/2009 | Smith et al. |
| 2002/0034290 A1 | 3/2002 | Pershan |
| 2003/0174996 A1 * | 9/2003 | Henschel et al. ............ 385/135 |
| 2004/0074852 A1 | 4/2004 | Knudsen et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0129379 A1 | 6/2005 | Reagan et al. |
| 2005/0180702 A1 | 8/2005 | Kevern et al. |
| 2005/0281526 A1 | 12/2005 | Vongseng et al. |
| 2006/0003637 A1 | 1/2006 | Neumetzler et al. |
| 2006/0093301 A1 | 5/2006 | Zimmel et al. |
| 2006/0177190 A1 | 8/2006 | Vongseng et al. |

| | | | |
|---|---|---|---|
| 2006/0228086 A1 | 10/2006 | Holmberg et al. | |
| 2006/0263029 A1* | 11/2006 | Mudd et al. | 385/135 |
| 2006/0269204 A1* | 11/2006 | Barth et al. | 385/135 |
| 2006/0269205 A1 | 11/2006 | Zimmel | |
| 2006/0269206 A1 | 11/2006 | Zimmel | |
| 2006/0285807 A1 | 12/2006 | Lu et al. | |
| 2007/0031100 A1* | 2/2007 | Garcia et al. | 385/135 |
| 2007/0047893 A1 | 3/2007 | Kramer et al. | |
| 2007/0047894 A1* | 3/2007 | Holmberg et al. | 385/135 |
| 2007/0047896 A1* | 3/2007 | Kowalczyk et al. | 385/135 |
| 2007/0189691 A1* | 8/2007 | Barth et al. | 385/135 |
| 2007/0192817 A1 | 8/2007 | Landry et al. | |
| 2008/0008436 A1 | 1/2008 | Reagan et al. | |
| 2008/0019641 A1* | 1/2008 | Elkins et al. | 385/70 |
| 2008/0031585 A1 | 2/2008 | Solheid et al. | |
| 2008/0042535 A1 | 2/2008 | Guzzo et al. | |
| 2008/0042536 A1 | 2/2008 | Guzzo et al. | |
| 2008/0317425 A1 | 12/2008 | Smith et al. | |
| 2009/0022467 A1 | 1/2009 | Puetz et al. | |
| 2009/0074372 A1 | 3/2009 | Solheid et al. | |
| 2009/0087157 A1 | 4/2009 | Smith et al. | |
| 2009/0103879 A1* | 4/2009 | Tang et al. | 385/135 |
| 2009/0190896 A1 | 7/2009 | Smith et al. | |
| 2009/0196565 A1 | 8/2009 | Vonseng et al. | |

FOREIGN PATENT DOCUMENTS

| | | |
|---|---|---|
| EP | 0 871 047 A1 | 10/1998 |
| EP | 0 975 180 A1 | 1/2000 |
| EP | 1 045 267 A1 | 10/2000 |
| JP | 63-229409 | 9/1988 |
| WO | WO 98/53347 | 11/1998 |
| WO | WO 00/75706 A2 | 12/2000 |
| WO | WO 02/103429 A2 | 12/2002 |

OTHER PUBLICATIONS

U.S. Appl. No. 11/699,716, filed Jan. 29, 2007.
Brochure from Amphenol Corp. entitled "Amphenol® 954 Series one piece SC Connector," 2 pgs. (1990).
AMP Inc. catalog entitled "Fiber Optic Products," front and back covers and p. 59, (4 pgs.) (© 1991).
HRS catalog entitled "Optical Fibre Connectors," front and back covers and pp. 16, 17 and 49 (5 pages) (Mar. 1991).
AT&T Network Systems catalog entitled "Fiber Optic Products Innovation for wide ranging applications," front and back covers and pp. 6-1 through 6-16 (18 pages) (© 1995).
NTT Int'l Fiber Termination Module (FTM) & Premises Optical Distribution Cabinets (PODC) product brochure, 3 pages (Applicants admit as prior art as of the filing date).
ADC Telecommunications, Inc.'s Outside Plant, Fiber Cross-Connect Solutions Products Brochure; front cover, Table of Contents, pp. 1-48, and back cover; revised Jun. 2002, Item No. 1047.
ADC Telecommunications, Inc.'s 6th Edition of Next Generation Frame (NGF) Product Family Ordering Guide; front cover, Table of Contents, pp. 1-41, and back cover; revised Feb. 2003, Item No. 820.
ADC Telecommunications, Inc.'s Fiber Optic, Cable Assemblies and Accessories Brochure; front cover, Table of Contents, pp. 1-23, and back cover; revised Apr. 2003, Item No. 100300.
ADC Telecommunications, Inc.'s OMX™ 600, Optical Distribution Frame Brochure; front cover, Table of Contents, pp. 1-14, and back cover; revised Feb. 2000, Item No. 854.
Iwano, S. et al., "MU-type Optical Fiber Connector System," *NTT Review*, vol. 9, No. 2, pp. 63-71 (Mar. 1997).
Sugita, E. et al., "SC-Type Single-Mode Optical Fiber Connectors," *Journal of Lightwave Technology*, vol. 7, No. 11, pp. 1689-1696 (Nov. 1989).
FONS Corporation's MDC Series Rack or Wall Mount Enclosures product sheet, 3 pages, (2002).
FONS Corporation's Modular Distribution Cabinets Rack Mount Enclosures, Model MDC-7, product sheet, 2 pages (2005) (shows the same device as shown in Exhibit L).
FONS Corporation's Technical Drawing No. 11669, Rev. D, of Distribution Cabinet Assembly MFDC-7, 1 page (technical drawing depicting the device shown in Exhibit M).
ADC Telecommunications, Inc.'s Secure Fiber Entrance Terminal (SFET) Brochure; front cover, pp. 2-7, and back cover; revised May 1998, Item No. 1005.
ADC Telecommunications, Inc.'s 2nd Edition of Fiber Panel Products; front cover, Table of Contents, pp. 1-111, and back cover; revised Jul. 1996, Item No. 846.
Catalogue for Fiber Connections, Inc., *Gator Patch*™, 2 pages, May 2003.
ADC Telecommunications, Inc., *Fiber Breakout Bay Cable Routing Guide*, ADCP-90-329, Issue 1, May 2002 (8 pages).
ADC Telecommunications, Inc., *Fiber Breakout Bay Cable Assembly Installation Guide*, ADCP-90-331, Issue 1, Sep. 2002 (18 pages).
*Nortel Networks OPTera Connect DX—ADC Fiber Breakout Bay*, a power point presentation by ADC Telecommunications, Inc., dated Jan. 16, 2002 (10 pages).
*DX Breakout Bay Concept 2*, a power point presentation by ADC Telecommunications, Inc., (Applicants admit the presentation as prior art as of Jan. 16, 2002) (7 pages).
ADC Telecommunications, Inc., *FL2000 System*, pp. 45-60 (©2000).
Photograph showing a rear, isometric view of the FL2000 panel of Exhibit E, 1 page (Applicants admit the photograph as prior art as of Mar. 20, 2002).
Technical Drawing having identification no. 1180521, *FL2 48 Position Mtp Adapter BRKT*, showing one example bracket suitable for mounting to the FL2000 panel of Exhibit E, 1 page, dated Mar. 20, 2002.
*2RU 32 Circuit FMT Review and General FMT Program Update for Cisco*, a power point presentation by ADC Telecommunications, Inc., dated Aug. 18, 2005 (12 pages).
Technical Drawings having identification No. 1254181, *Drw-Cisco Patch Panel Specification*, showing various views of a patch panel drawer and system, 8 pages (Jul. 25, 2003).
ADC FONS Outdoor Distribution Enclosure (ODE-13) Installation Instructions, Issue 1, 20 pages (Jun. 2006).
U.S. Appl. No. 12/426,723 filed Apr. 20, 2009 entitled "Parking In Fiber Distribution Hubs" inventors: Reagan et al.
U.S. Appl. No. 12/435,170 filed May 4, 2009 entitled "Parking In Fiber Distribution Hub" inventors: Reagan et al.
U.S. Appl. No. 12/435,181 filed May 4, 2009 entitled "Parking In Fiber Distribution Device" inventors: Reagan et al.

* cited by examiner

FIBER DISTRIBUTION HUB WITH MODULAR TERMINATION BLOCKS

CROSS REFERENCE TO RELATED APPLICATIONS

This application claims priority from provisional application Ser. No. 60/712,147, filed Aug. 30, 2005, and which is incorporated herein by reference.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 101 that connects a number of end subscribers 105 (also called end users 105 herein) in a network. The central office 101 can additionally connect to a larger network such as the Internet (not shown) and a public switched telephone network (PSTN). The network 100 can also include fiber distribution hubs (FDHs) 103 having one or more optical splitters (e.g., 1-to-8 splitters, 1-to-16 splitters, or 1-to-32 splitters) that generate a number of individual fibers that may lead to the premises of an end user 105. The various lines of the network 100 can be aerial or housed within underground conduits.

The portion of the network 100 that is closest to central office 101 is generally referred to as the F1 region, where F1 is the "feeder fiber" from the central office 101. The portion of the network 100 closest to the end users 105 can be referred to as an F2 portion of network 100. The network 100 includes a plurality of break-out locations 102 at which branch cables are separated out from the main cable lines. Branch cables are often connected to drop terminals 104 that include connector interfaces for facilitating coupling of the fibers of the branch cables to a plurality of different subscriber locations 105.

Splitters used in an FDH 103 can accept a feeder cable F1 having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 103 as required.

SUMMARY

Certain aspects of the disclosure relate to fiber optic cable systems.

In example systems, a fiber distribution system includes one or more fiber distribution hubs (FDHs) that provide an interface between the central office and the subscribers.

Certain aspects of the disclosure relate to enhanced access and scalability through the use of modular components, such as modular subscriber termination components.

Other aspects of the disclosure relate to cable routing configurations.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
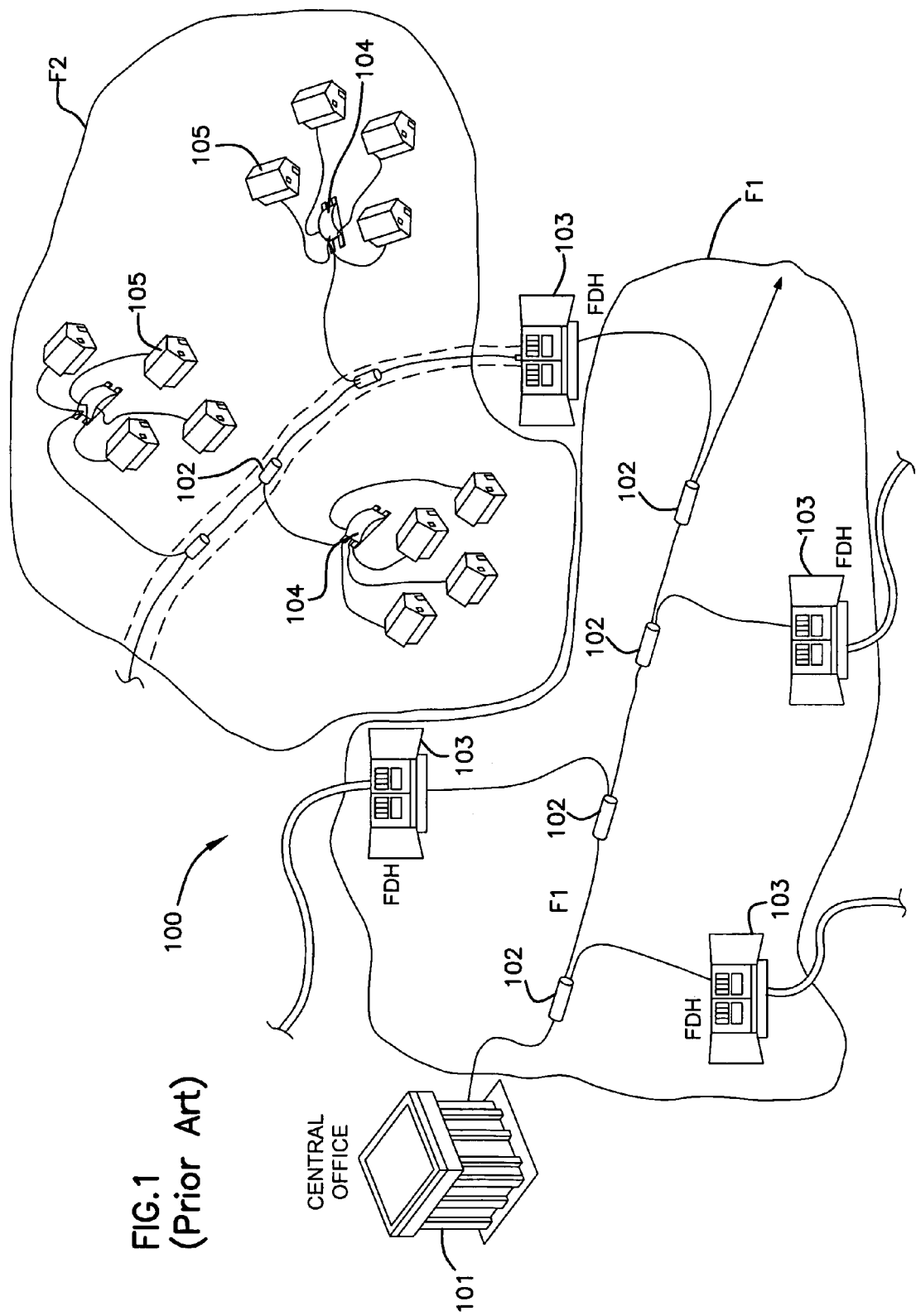
FIG. 1 shows a passive fiber optic network.

Referring now to FIGS. 2-6, example fiber distribution hubs (FDH) 200 having features that are examples of inventive aspects in accordance with the principles of the present disclosure are shown. Generally, a FDH 200 includes a cabinet 201 (FIG. 3) that houses internal components. The cabinet 201 is configured to receive a feeder cable (e.g., or F1 cable) 700 and a subscriber cable 708 (see FIG. 2).

In certain embodiments, a swing frame 300 (FIG. 2) is pivotably mounted (e.g., on hinges) within the cabinet 201. The swing frame 300 includes a bulkhead 301 (FIG. 11) that divides the swing frame 300 into a front portion 302 (see FIG. 4) and a back portion 304 (see FIG. 11). The bulkhead 301 includes a termination region 340, a splitter region 350, and a storage region 360 (see FIG. 2). In other embodiments, however, the termination region 340, splitter region 350, and storage region 360 can also be fixedly located within the cabinet 201. In some embodiments, the bulkhead 301 also includes a cable management area 370 (e.g., see FIGS. 4-6).

Generally, at least one termination module 400 (see FIGS. 8 and 10) can be installed at the termination region 340, at least one splitter 500 (FIG. 7) can be installed at the splitter region 350, and at least one storage module 600 (see FIG. 7) can be installed at the storage region 360. One or more feeder cable interfaces 800 (FIG. 2) can be installed on or adjacent the swing frame 300.

The FDH 200 generally administers connections at a termination panel (e.g., the termination region 340 of bulkhead 301) between incoming fiber and outgoing fiber in an Outside Plant (OSP) environment. As the term is used herein, "a connection" between fibers includes both direct and indirect connections. Examples of incoming fibers include the feeder cable fibers 700 that enter the cabinet and intermediate fibers (e.g., connectorized pigtails extending from splitters and patching fibers/jumpers) that connect the feeder cable fibers 700 to the termination panel. Examples of outgoing fibers include the subscriber cable fibers 708 that exit the cabinet and any intermediate fibers that connect the subscriber cable fibers 708 to the termination panel. The FDH 200 provides an interconnect interface for optical transmission signals at a location in the network where operational access and reconfiguration are desired. For example, as noted above, the FDH 200 can be used to split the feeder cables and terminate the split feeder cables to distribution cables routed to subscriber locations. In addition, the FDH 200 is designed to accommodate a range of alternative sizes and fiber counts and support factory installation of pigtails, fanouts and splitters.

Figure 2:
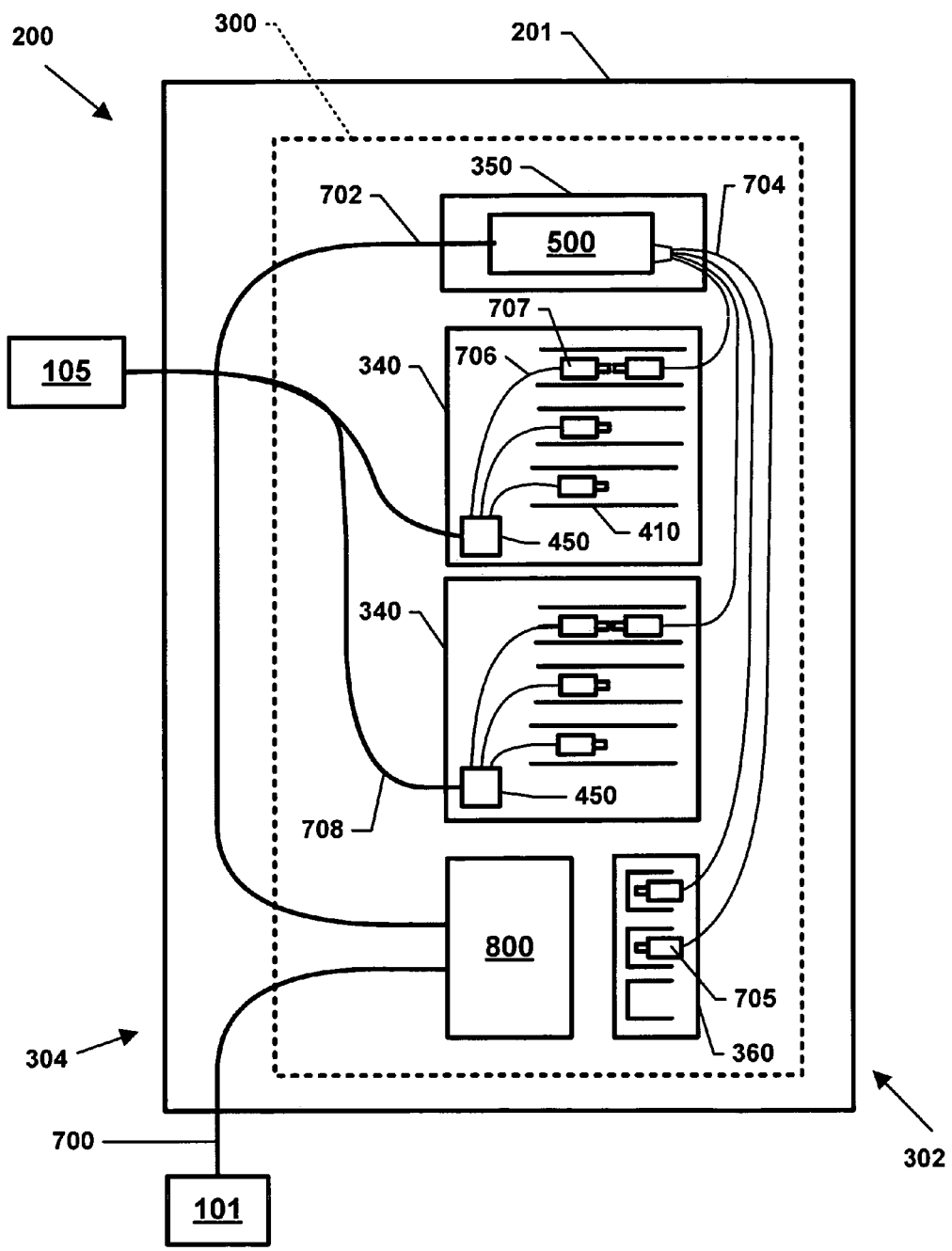
FIG. 2 is a schematic diagram of a cable routing scheme for a fiber distribution hub (FDH)

As shown at FIG. 2, a feeder cable 700 is initially routed into the FDH 200 through the cabinet 201 (e.g., typically through the back or bottom of the cabinet 201). In certain embodiments, the fibers of the feeder cable 700 can include ribbon fibers. An example feeder cable 700 may include twelve to forty-eight individual fibers connected to a service provider central office 101. In some embodiments, after entering the cabinet 201, the fibers of the feeder cable 700 are routed to a feeder cable interface 800 (e.g., fiber optic adapter modules, a splice tray, etc.). At the feeder cable interface 800, one or more of the fibers of the feeder cable 700 are individually connected to separate splitter input fibers 702. The splitter input fibers 702 are routed from the feeder cable interface 800 to the splitter region 350.

At the splitter region 350, the splitter input fibers 702 are connected to separate splitters 500, at which the input fibers 702 are each split into multiple pigtails 704, each having connectorized ends 705. Typically, each splitter 500 receives between one and four fibers 702 and outputs between two and sixteen fibers 704 for every input fiber 702. In other embodiments, however, the fibers of the feeder cable 700 can be connectorized and can be routed directly to the splitters 500 thereby bypassing or eliminating the need for an intermediate feeder cable interface 800.

When the splitter pigtails 704 are not in service, the connectorized ends 705 can be temporarily stored on one or more storage modules 600 that are mounted at the storage region 360. When the splitter pigtails 704 are needed for service, the pigtails 704 are routed from the splitters 500 to one or more termination modules 400 that are provided at the termination region 340.

The termination region 340 is the dividing line between incoming fibers and outgoing fibers. At the termination modules 400, the pigtails 704 are optically coupled to the subscriber cable 708 via adapters 410. A typical distribution cable 708 forms the F2 portion of a network (see FIG. 1) and typically includes a plurality of fibers (e.g., 144, 216 or 432 fibers) that are routed from the FDH 200 to subscriber locations 105.

In some embodiments, the fibers of the subscriber cable 708 have connectorized ends that can be inserted into the adapters 410. In other embodiments, the fibers of the subscriber cable 708 are coupled to a cable interface 450 at which the fibers are interfaced with intermediate fibers 706. The intermediate fibers 706 extend from the cable interface 450 to fiber connectors 707 configured to be inserted into the rear side of the adapters 410. In still other embodiments, the intermediate fibers 706 can be spliced to the distribution cable 708.

In some embodiments, one or more of the fibers of the feeder cable 700 are not connected to any of the splitters 500. Rather, these fibers of the feeder cable 700 are connected to pass-through fibers (not shown) having connectorized ends. The pass-through fibers are connected to the termination modules 400, without first connecting to the splitters 500. By refraining from splitting a fiber, a stronger signal can be sent through the fiber to one of the subscribers. In one embodiment, the connectorized ends of the pass-through fibers can be stored at the storage region 360 when not in use.

Figure 3:
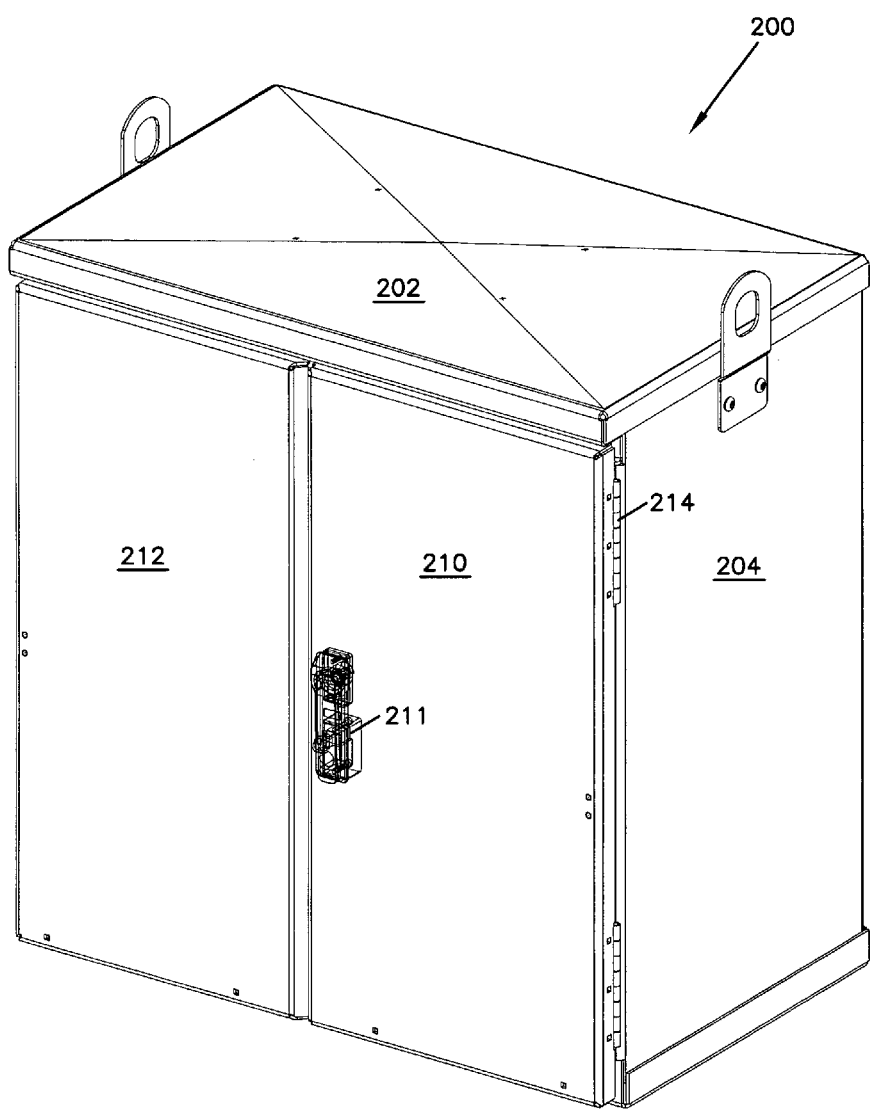
FIG. 3 is a front, perspective view of an exterior of an example FDH cabinet, the cabinet including two doors in the closed position.
Figure 4:
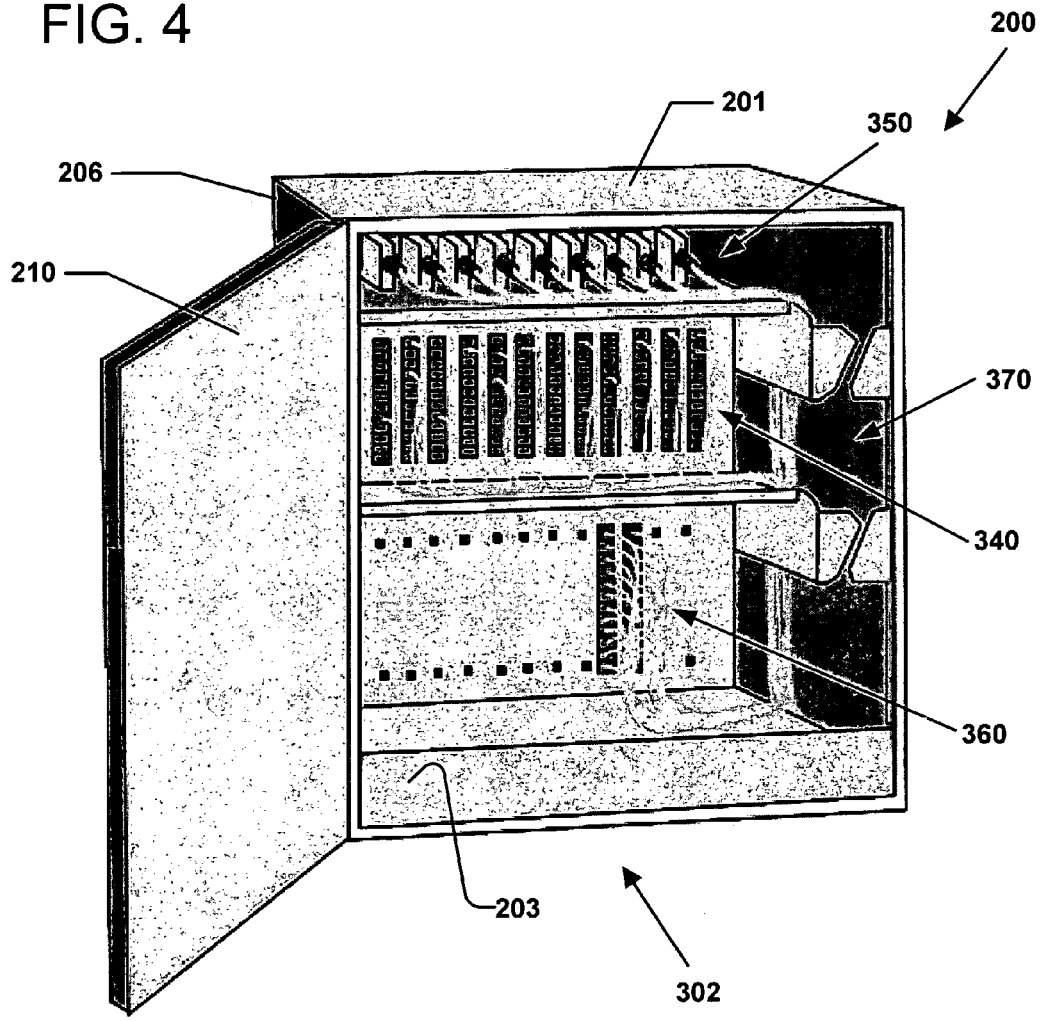
FIG. 4 is a front, perspective view of another example FDH cabinet, the cabinet including one door in the open position revealing a splitter region located at a top of the cabinet, a termination region located beneath the splitter region, and a storage region located beneath the termination region.

Referring to FIGS. 3-6, the cabinet 201 of a FDH 200 generally includes a top panel 202 (FIG. 3), a bottom panel 203 (FIG. 4), a right side panel 204 (FIG. 3), a left side panel 206 (FIG. 4), a back panel (not shown), and at least one front door 210 (FIG. 4). In some embodiments, the at least one front door includes a first door 210 and a second door 212 (FIG. 3). In one embodiment, the front doors 210, 212 include a lock 211 (FIG. 3). The at least one front door 210 can be pivotally mounted to the cabinet 201 using hinges 214, 216 (FIG. 3) to facilitate access to the components mounted within the cabinet 201.

In general, the cabinet 201 of the FDH 200 is configured to protect the internal components against rain, wind, dust, rodents and other contaminants. However, the cabinet 201 remains relatively lightweight for easy installation, and breathable to prevent accumulation of moisture in the unit. In some embodiments, an aluminum construction with a heavy powder coat finish also provides for corrosion resistance. In one example embodiment, the cabinet 201 is manufactured from heavy gauge aluminum and is NEMA-4X rated. In other embodiments, however, other materials can also be used.

In accordance with example embodiments, the FDH 200 can be provided in a pole mount or a pedestal mount configuration. For example, as shown in FIG. 3, loops 218 can be provided on the cabinet 201 for facilitating deployment of the cabinet 201 at a desired location. The loops 218 can be used to position the cabinet 201 using a crane. In particular, the crane can lower the cabinet 201 into an underground region or vault. In some embodiments, the loops 218 are removable or can be adjusted to not protrude from the top cabinet panel 202. Further information regarding pedestal mount locations can be found in the utility application Ser. No. 11/513,911, filed Aug.30, 2006and titled "Post Mount for a Fiber Distribution Hub," the disclosure of which is hereby incorporated by reference.

In general, a swing frame 300 of the FDH 200 can be pivotably mounted (e.g., on hinges) within the cabinet 201. In one embodiment, the entirety of the swing frame 300, including the termination region 340, the storage region 360, and the splitter region 350, can be swung out of the front door 210 of the cabinet 201 to enable access to optical components in the rear portion 304 of the swing frame 300 for cleaning, testing, maintenance, additions, etc. Pivoting the swing frame 300 out of the cabinet 201 causes one side of the swing frame 300 to move away from the interior volume of the cabinet 201 (not shown). In some example embodiments, the swing frame 300 can be pivoted ninety degrees or more out of the cabinet 201.

In some embodiments, the pivot axis of the swing frame 300 is positioned to provide a single point of flex for the fiber cables routed to the swing frame 300. This pivot axis is configured to control the fiber bend. In particular, the pivot axis is configured to ensure that manufacture recommended bend radii are maintained when the swing frame 300 is opened or closed. In one embodiment, the cabinet 201 can be configured at a factory, or plant, so as to have cable bundles dressed about the pivot axis. Precabling the cabinet 201 reduces the chance that cabling will be done incorrectly.

Components in the rear portion 304 of the swing frame 300 are accessible when the swing frame 300 is in the open position. In contrast, when the swing frame 300 is in the closed position, only components on the front portion 302 of the swing frame 300 are readily accessible. In the embodiment shown in FIG. 4, the splitter region 350 is located at the front and top of the swing frame 300, the storage region 360 is located at the front and bottom of the swing frame 300, and the termination region 340 is located intermediate the splitter region 350 and the storage region 360. In such embodiments, the splitters 500 located in the splitter region 350 are accessible through the open top of the swing frame 300 when the swing frame 300 is swung out of the cabinet 201.

Figure 5:
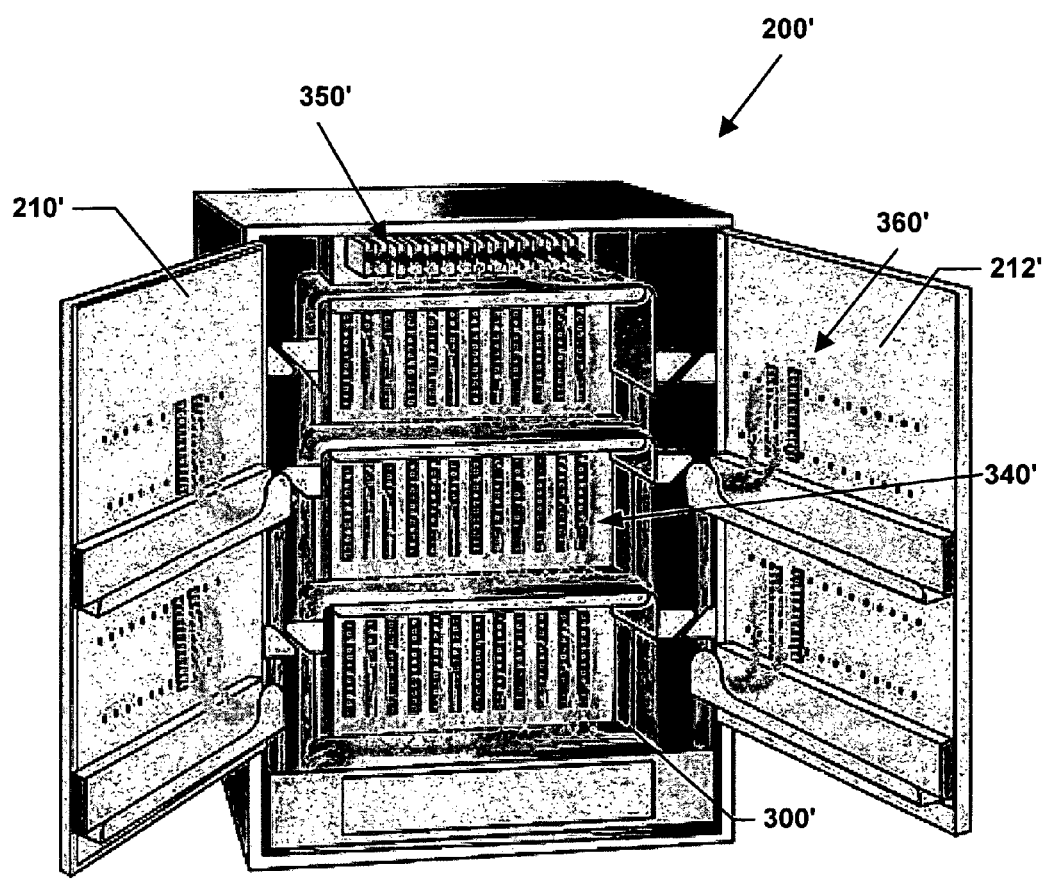
FIG. 5 is a front, perspective view of yet another example FDH cabinet, the cabinet including two doors in the open position revealing a splitter region located at a top of the cabinet, three termination regions located beneath the splitter region, and storage regions located on the interior of the doors.
Figure 6:
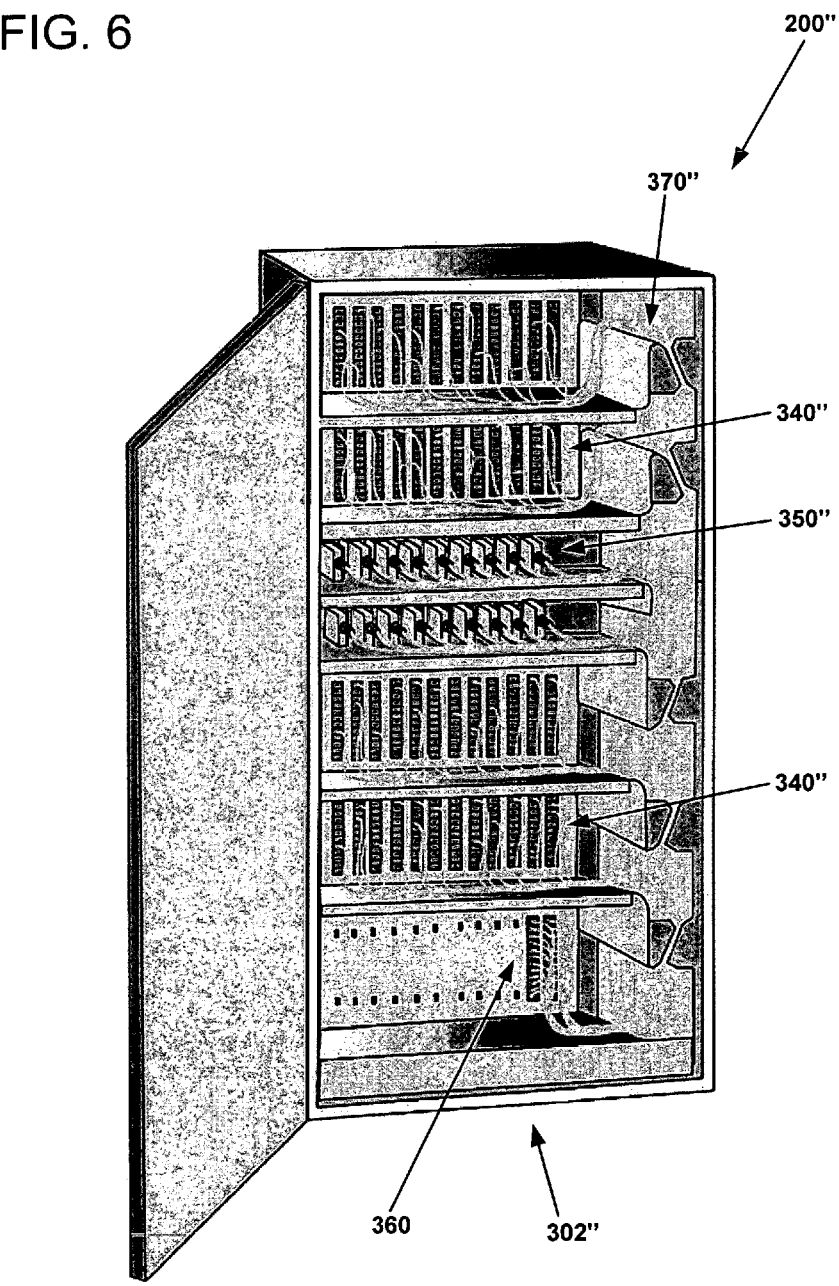
FIG. 6 is a front, perspective view of yet another example FDH cabinet, the cabinet including one door in the open position revealing a splitter region located intermediate multiple termination regions and a storage region located beneath the termination region.

In an alternative embodiment, storage regions 360' can be located on the doors 210', 212' of the FDH 200' instead of on the swing frame 300 (see FIG. 5). Positioning the storage regions 360' on the doors 210, 212 enables a greater number of termination modules 400 to be installed on the bulkhead 301 of the swing frame 300. In yet another embodiment, as shown in FIG. 6, termination modules 340" can be located both above and beneath the splitter region 350".

In example embodiments, the swing frame 300 includes a release latch (not shown) that locks the swing frame 300 in a closed position within the cabinet 201 of the FDH 200 until the latch is actuated. When the latch is actuated, the swing frame 300 can be pivoted out of the cabinet 201. In addition, a pivoting locking member (not shown) can be mounted to the swing frame 300 to hold the swing frame 300 in the open position.

Figure 7:
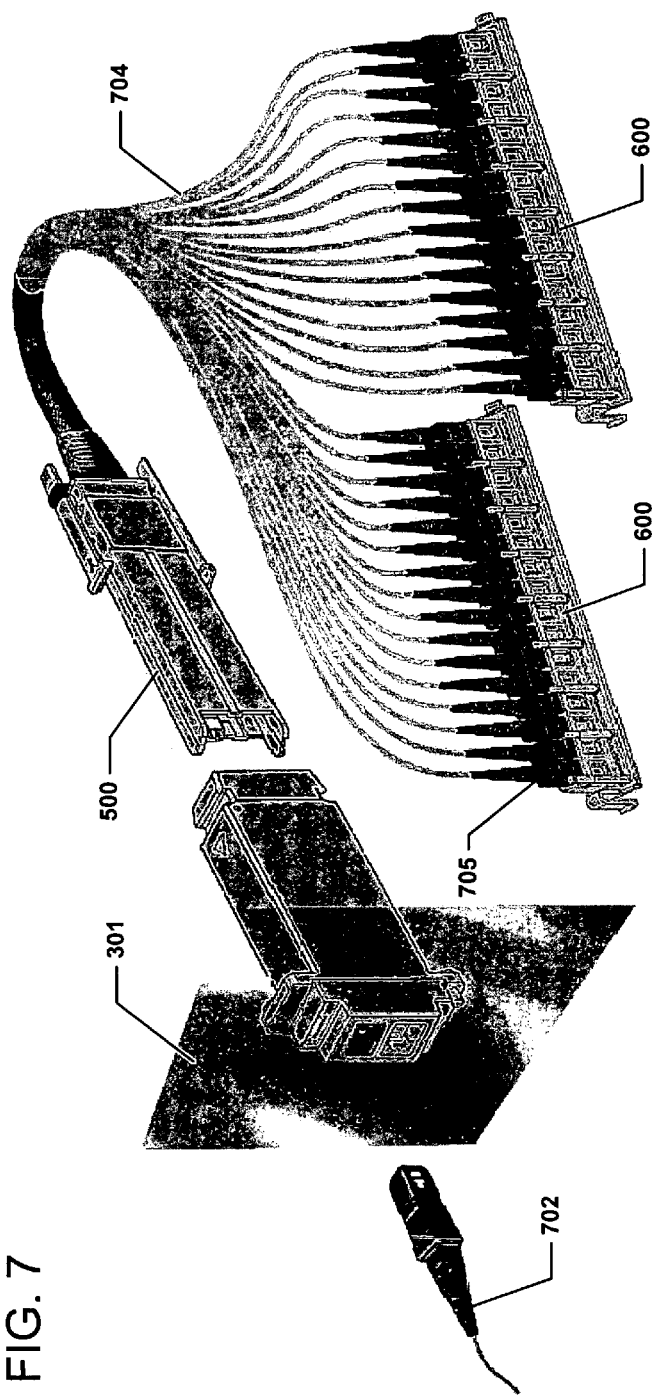
FIG. 7 is a partial, exploded view of an example splitter configured to mount incrementally to an FDH, the splitter having pigtail fibers extending from a boot and terminating at storage modules.

Referring now to FIGS. 7-10, the termination modules 400, splitter modules 500, and storage modules 600 can be incrementally added to the FDH 200. For example, FIG. 7 illustrates an example splitter 500 coupled to two example storage modules 600. Further information regarding the incremental addition of splitter modules 500 can be found in the utility application Ser. No. 11/213,772, filed Aug. 30, 2005, and titled "Compact Blind Mateable Optical Splitter," the disclosure of which is hereby incorporated by reference. Further information regarding incremental addition of storage modules 600 can be found in U.S. application Ser. No. 10/871,555, filed Jun. 18, 2004, and titled "Multi-Position Fiber Optic Connector Holder;" and U.S. application Ser. No. 11/203,157, filed Aug. 15, 2005, and titled "Hinged Parking in Fiber Distribution Hubs," the disclosures of which are hereby incorporated by reference. This document will focus on the incremental addition of termination modules 400 to the swing frame 300.

Figure 8:
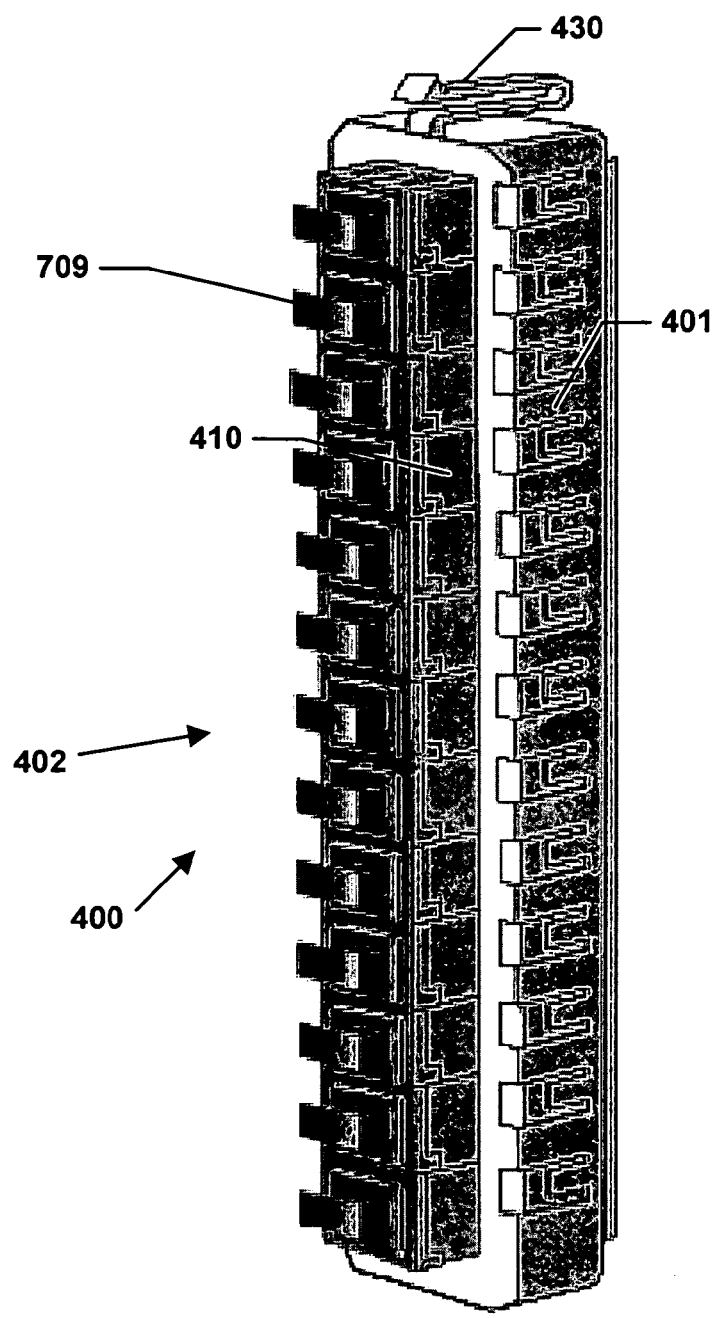
FIG. 8 is a front, perspective view of a housing of a termination module.
Figure 9:
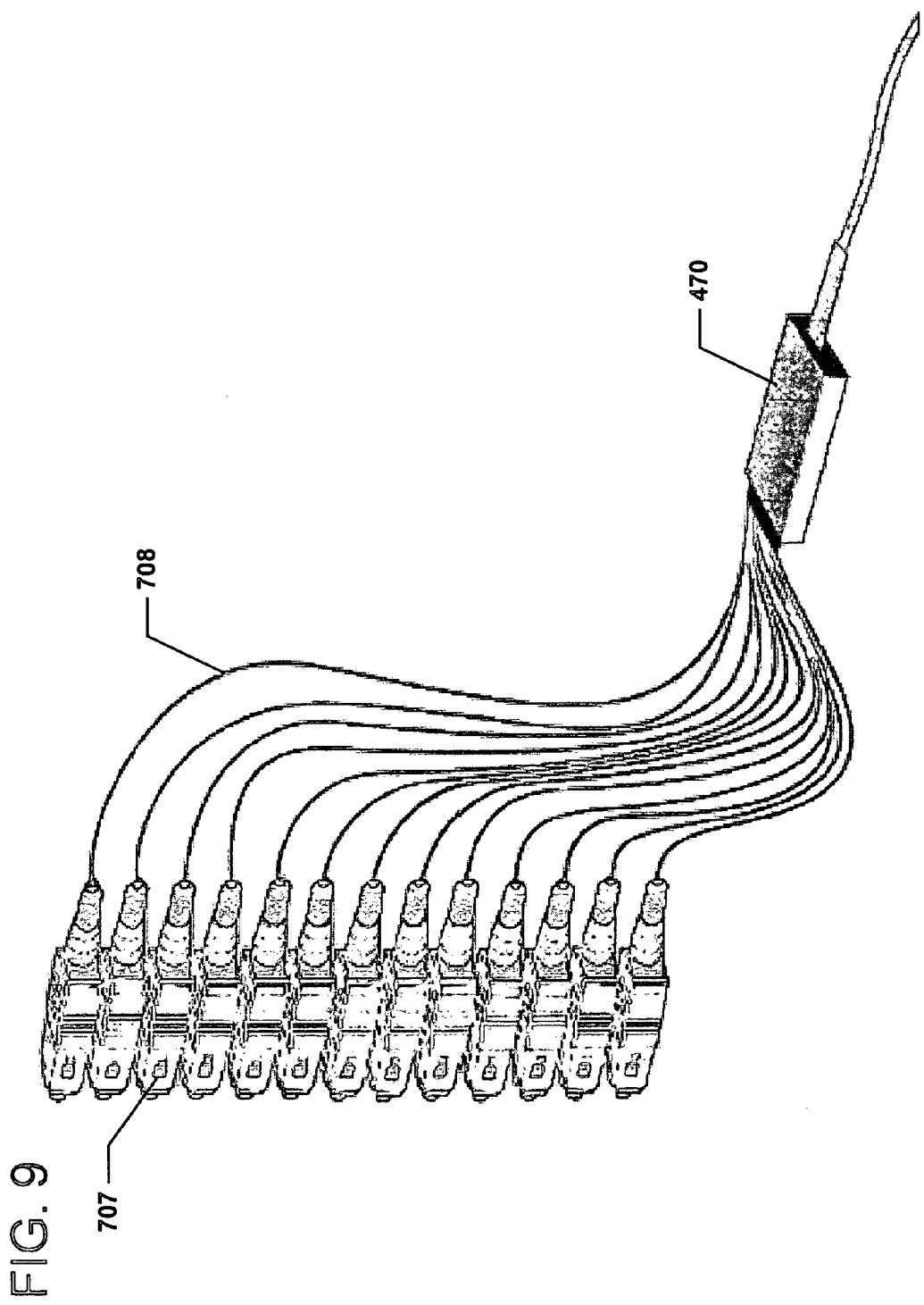
FIG. 9 is a rear, perspective view of twelve connectors configured to be received in the rear of the termination module of FIG. 8, the connectors having fibers extending from the connectors to a fanout.
Figure 10:
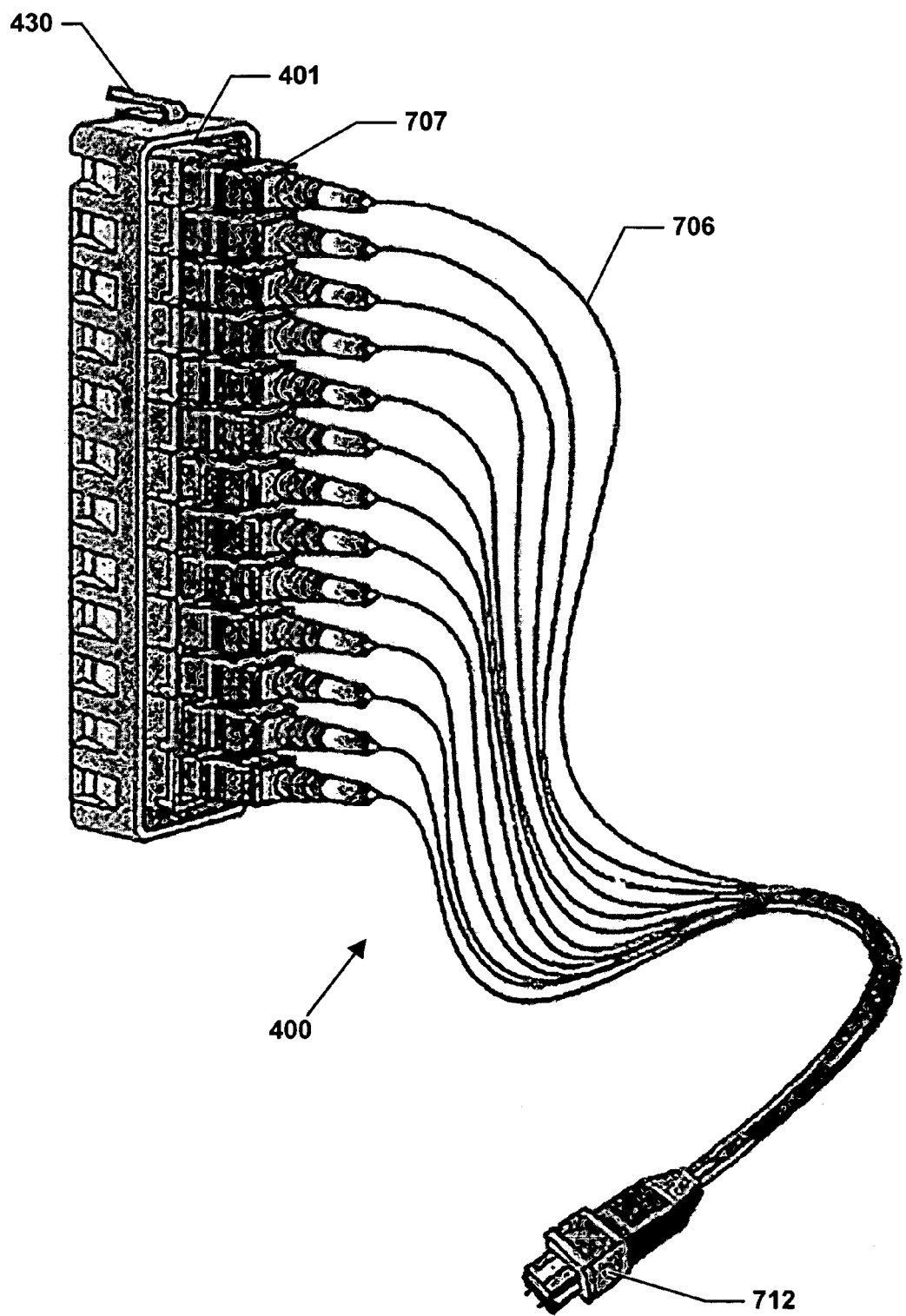
FIG. 10 is a rear, perspective view of the termination module of FIG. 8 coupled to twelve connectors from which fibers extend and terminate at a multi-fiber connector.

Referring to FIGS. 8-10, as time passes and the number of subscribers increases, a user can add termination modules 400 to the swing frame 300. FIGS. 8-10 illustrate one example of a termination module 400. The termination module 400 includes a body 401 having a front side 402 (see FIG. 8) and a rear side 404 (see FIG. 10). The body 401 is configured to hold at least one fiber optic adapter 410 extending from the front side 402 to the rear side 404. Typically, the body 401 is configured to hold about twelve fiber optic adapters 410 (see FIG. 8). In some embodiments, the adapters 410 are arranged in a single row configuration. In other embodiments, the adapters 410 can be arranged in a square pattern or in any other desired configuration.

The front 402 of each fiber optic adapter 410 is configured to receive a connectorized end 705 of a splitter pigtail 704 and the rear 404 is configured to receive a connectorized end 707 of the subscriber cable 708 or an intermediate fiber 706. The adapters 410 align and optically couple the connectorized ends 705, 707 of the fibers. In some embodiments, the adapters 410 are configured to receive SC/APC connectors. In other embodiments, however, the adapters 410 can be configured to receive any desired type of optical connector.

In some embodiments, fibers are routed from the connectors 707 to a fanout 470 (FIG. 9) from which a ribbonized intermediate cable 706 extends. In other embodiments, however, intermediate fibers 706 extend outwardly from the connectors 707 and terminate at a multi-fiber connector 712 (FIG. 10). Examples of multi-fiber connectors are disclosed in U.S. Pat. No. 6,957,920 and U.S. Publication No. 2005/0180702 A1, the disclosures of which are hereby incorporated by reference in their entirety. The multi-fiber connector 712 can be interfaced with the subscriber cable 708 at an adapter 455 provided at the cable interface 450 (FIG. 2). Examples of adapters configured to receive multi-fiber connectors are disclosed in U.S. Pat. No. 5,867,621 and U.S. Pat. No. 6,863,446, the disclosures of which are incorporated by reference. Alternatively, the intermediate fibers 706 can be spliced to the subscriber cable 708.

Figure 11:
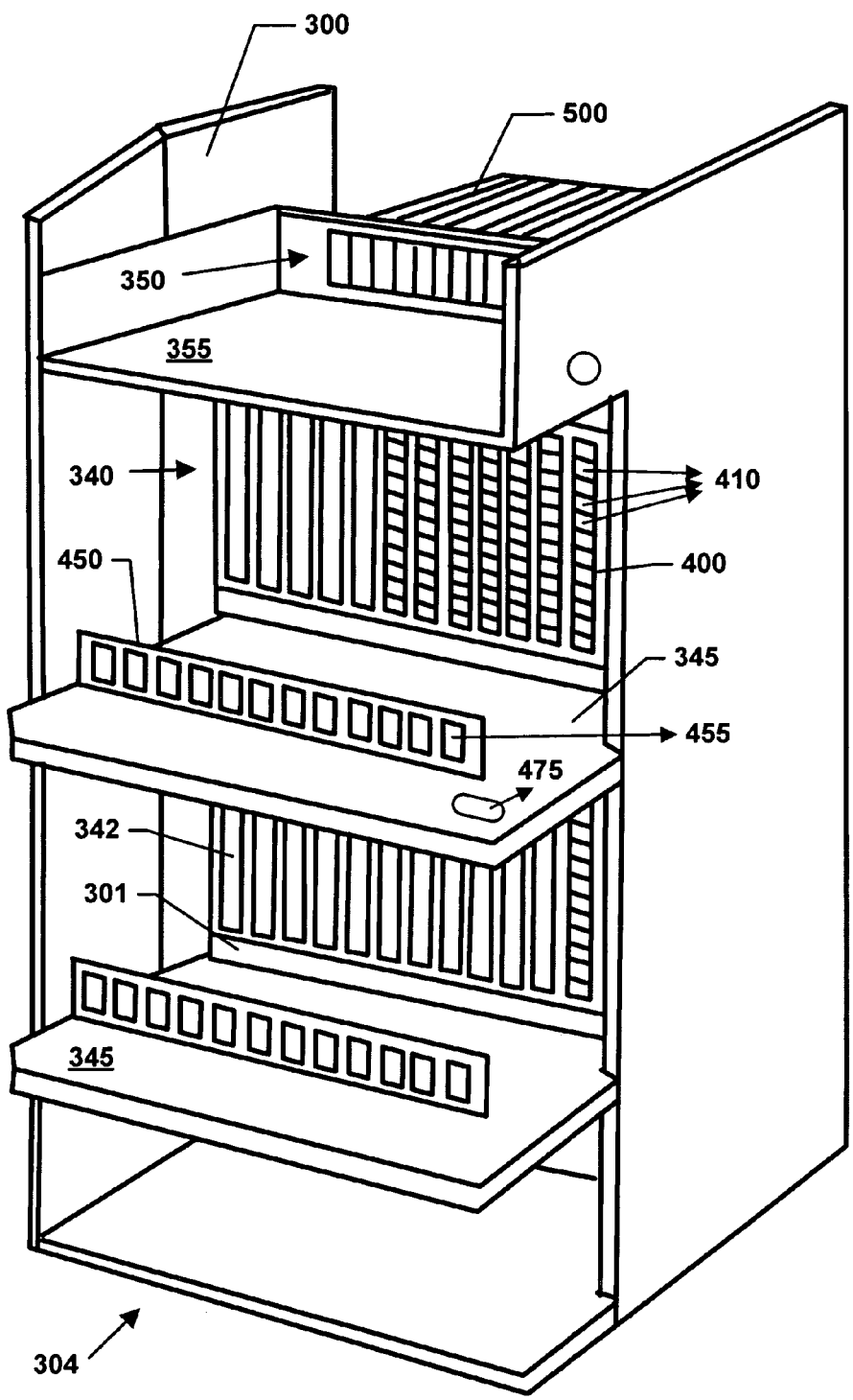
FIG. 11 is a rear, perspective view of a swing frame including a splitter region and two termination regions, the swing frame also include shelves extending rearwardly at the splitter and termination regions.
Figure 12:
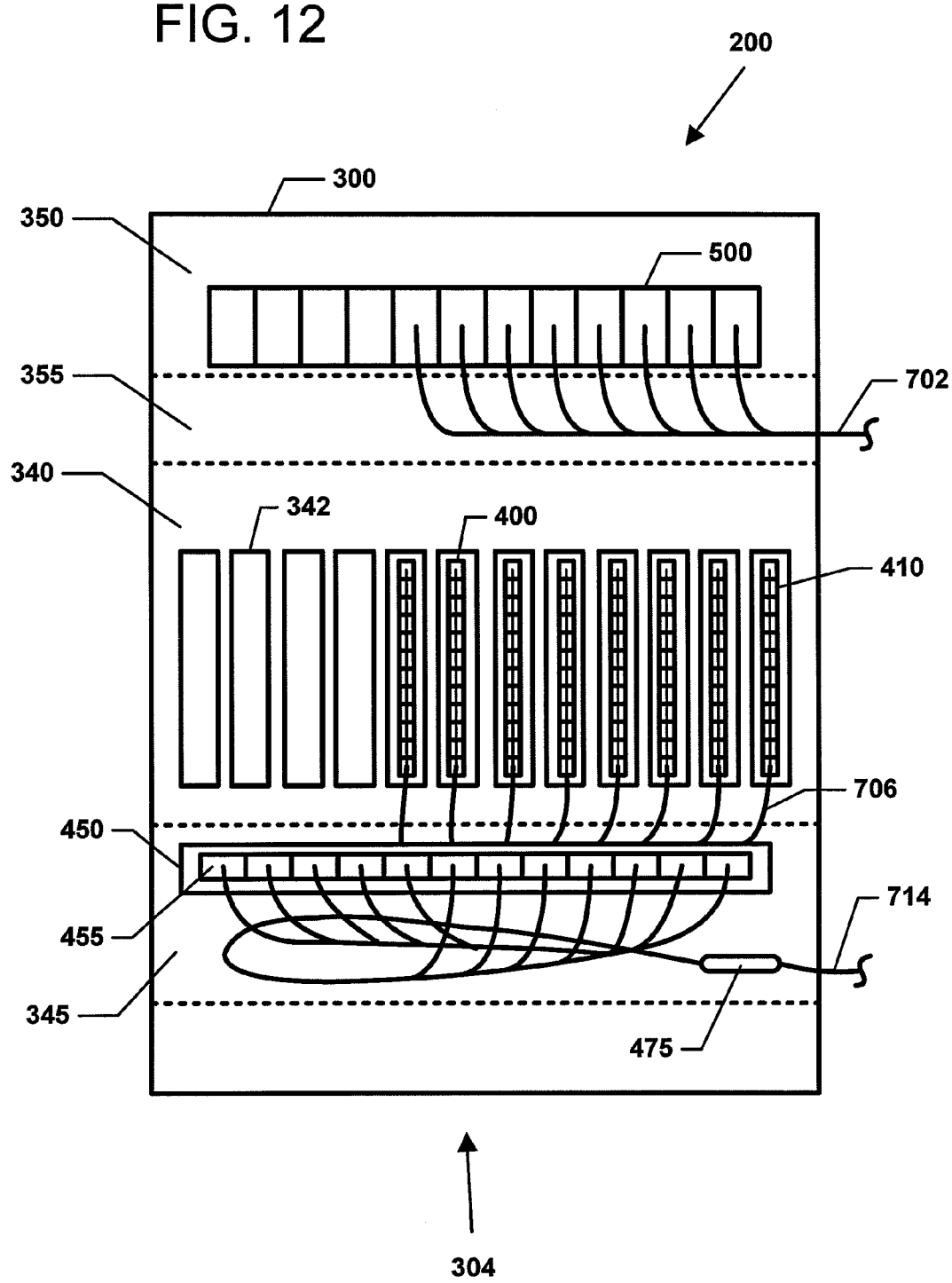
FIG. 12 is a rear view of a bulkhead including a splitter region and a termination region, wherein eight termination modules are installed at the termination region.
Figure 13:
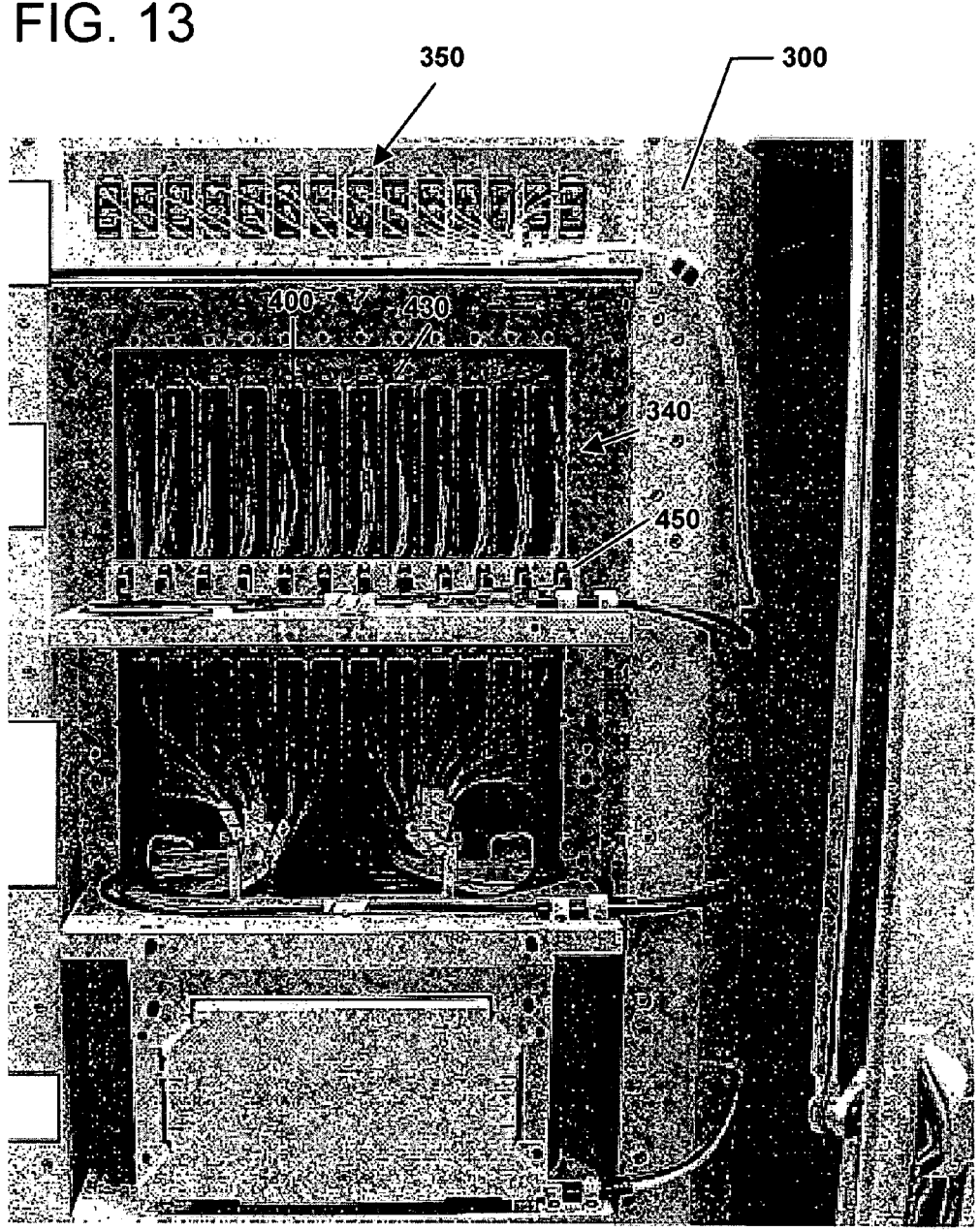
FIG. 13 is a rear view of a swing frame of a FDH, the swing frame including multiple termination modules installed at termination regions on the swing frame.

Referring to FIGS. 11-13, the FDH 200 can be precabled in anticipation of the user installing one or more termination modules 400. For example, one or more adapters 455 can be provided at the cable interface 450 to receive the multi-fiber connector (MFC) 712 of each termination module 400. MFC connectors terminating either the subscriber cable 708 or a stub cable 714 interfaced with the distribution cable 708 are inserted into the adapters 455 at the factory. Dust plugs (not shown) can be installed on the front end of each adapter 455 until a corresponding termination module 400 is installed.

Alternatively, one or more termination modules 400 can be installed at the termination region 340 of the FDH 200 at the factory before deployment. Termination modules 400 can also be added incrementally after deployment of the FDH 200. In some embodiments, the termination modules 400 installed at the factory can be precabled to hold the connectorized ends 707 of the intermediate fibers 706. The opposite ends of the intermediate fibers 706 terminate at the MFC connector 712 which is inserted into an adapter 455 at the cable interface 450. Dust caps 709 (FIG. 8) are generally provided on the front end 402 of the adapters 410 of the termination module 400 to protect the terminated intermediate fibers 706 from dust, dirt, and other contaminants. In other embodiments, the termination module 400 is not precabled and dust caps 709 are also provided on the rear ends 404 of the adapters 410 to protect the adapters 410.

In general, the termination region 340 defines at least one opening 342 at which a termination module 400 can be installed. In the embodiments shown in FIGS. 11 and 12, the termination region 340 includes twelve elongated, rectangular openings 342. Each opening 342 is configured to receive a storage module body 401 arranged to retain twelve fiber optic adapters 410 in a row. In other embodiments, however, any desired number of openings 342 can be arranged in any desired configuration. Typically, the openings 342 are sufficiently spaced to provide a surface on the bulkhead 301, for example, on the front of the bulkhead 301, for adhering labeling information (e.g., connector designations).

In some embodiments, the front side 402 of the termination module 400 mounts to the rear side of the bulkhead 301 of the swing frame 300. The front 402 of the adapters 410 protrudes forwardly from the body 401 so that the connectors 705 of the splitter pigtails 704 enter the front ends of the adapters 410 from the front side 302 of the bulkhead 301 and the connectors 707 of the intermediate fibers 706 enter the rear sides 404 of the adapters 410 from the rear side 304 of the bulkhead 301.

In some embodiments, the body 401 is designed to snap into one of the openings 342 defined in the termination region 340. In one embodiment, the termination module 400 mounts to the bulkhead 301 with one or more latches 430. For example, the termination module 400 shown in FIG. 10 includes a latch 430 on one end of the body 401. In other embodiments, however, additional latches 430 or other types of fasteners can be used. Other fasteners, such as screws, bolts, rivets, nails, and other such devices, can be used in addition or as an alternative to the latches 430 to connect the modules 400 to the bulkhead 301.

In certain embodiments, the swing frame 300 an include shelves extending rearwardly from the bulkhead 301. For example, a splitter shelf 355 can extend rearwardly from the bulkhead 301 adjacent the splitter region 350 and a termination shelf 345 can extend rearwardly from the bulkhead 301 adjacent the termination region 340 (see FIGS. 11-13). In some embodiments, the swing frame 300 includes multiple termination regions (e.g., termination regions 340 of FIG. 11). In such embodiments, an equal number of termination shelves 345 extend rearwardly from the bulkhead 301 adjacent the termination regions 340.

Typically, the shelves provide cable management. In some embodiments, a termination shelf 345 can include at least one cable management device for managing excess fiber length of the subscriber cable 708 or the stub fibers 714 (e.g., see FIG. 13). Generally, in such systems, the stub fibers 714 or subscriber cable fibers 708 are routed in a loop having a minimum bend radius to a fanout or other breakout device 475 (FIG. 11). The cable fanout 475 joins the fibers into a ribbonized cable. Examples of cable management devices that can be used to maintain the loop include a fiber spool, one or more radius bend limiters, one or more fiber clips, and other such devices. Alternatively, the fibers can be laid on the shelves in loops without interacting with cable management devices.

As shown in FIGS. 11, the cable interface 450 can include a panel located on a termination shelf 345. The panel 450 is configured to hold one or more adapters 455. Typically, the panel 450 includes an adapter 455 for each opening 342 configured to receive a termination module 400. Each adapter 455 is configured to receive and optically couple first and second multi-fiber connectors (MFC). In an alternative embodiment, the termination shelf 345 can be used to store mass splices between the intermediate fibers 706 and the distribution cable 708.

FIG. 11 illustrates one example FDH 200 including first and second termination regions 340 and shelves 345 extending rearwardly at each of the termination regions 340. Each termination region 340 defines rectangular openings 342, each opening 342 being configured to receive a termination module 400. Seven termination modules 400 have been installed in the first termination region 340 located nearest the splitter region 350. Only one termination module 400 has been installed at the other termination region 340. For ease in viewing, the fibers 706 of only one termination module 400 for each region 340 are illustrated. The fibers 706 extend rearwardly from the termination modules 400, over the shelf 345, to the panel 450.

At the first termination region 340, ends of stub cables 714 are terminated at multi-fiber connectors that are inserted into the opposite ends of the multi-fiber adapters 455. The stub multi-fiber cables 714 extend from the panel 450, over the shelf 345 in a configuration designed to maintain the manufacturer's suggested bend radii, and to a cable management device 475 that groups the cables 714 into one or more buffer tubes. The cables 714 are routed and optically coupled to the subscriber cable 708. The ribbonized stub cable 714 can be spliced to the subscriber distribution cable 708 within or outside the FDH 200. In various embodiments, the stub cable ranges in length from about 25 feet to about 300 feet.

In other embodiments, however, the distribution cable 708 can be routed into the cabinet 201 and spliced or otherwise connected to the termination module fibers 706. For example, the distribution cable 708 can terminate at one or more multi-fiber connectors. As shown at the second termination region 340 of FIG. 11, these connectors can be inserted into the adapters 455 at the panel 450 and directly interfaced with the termination module fibers 706.

It will be appreciated that the fiber distribution hub 200 can be manufactured in a variety of different sizes. However, to promote manufacturing efficiency, it is preferred for the splitters to be manufactured with pigtails having uniform lengths. To accommodate the different sizes of fiber distribution hubs, the pigtails are preferably designed long enough to work in the largest fiber distribution hub expected to be used. For the smaller distribution hubs, excess length provided in the pigtails can be taken up by wrapping the excess length around at fiber storage areas. For example, the excess length can be wrapped around spools 252, 254 (see FIG. 7) provided at the top of the swing frame.

Further examples of splitters 500 that can be utilized in the FDH 200 described herein can be found in U.S. patent application Ser. No. 11/354,297, filed Feb. 13, 2006, titled "Fiber Optic Splitter Module;" U.S. application Ser. No. 10/980,978, filed Nov. 3, 2004, titled "Fiber Optic Module And System Including Rear Connectors;" U.S. application Ser. No. 11/138063, filed May 25, 2005, titled "Fiber Optic Splitter Module;" U.S. application Ser. No. 11/215837, filed Aug. 29, 2005, entitled "Fiber Optic Splitter Module With Connector Access;" and U.S. application Ser. No. 11/321696, filed Dec. 28, 2005, titled "Splitter Modules For Fiber Distribution Hubs," the disclosures of which are hereby incorporated by reference.

Further examples of storage modules 600 that can be utilized in the FDH 200 described herein can be found in U.S. application Ser. No. 10/610,325, filed on Jun. 30, 2003, titled "Fiber Optic Connector Holder and Method;" U.S. application Ser. No. 10/613,764, filed on Jul. 2, 2003, titled "Telecommunications Connection Cabinet," the disclosures of which are hereby incorporated by reference.

The above specification, examples and data provide a complete description of the manufacture and use of the invention.

Since many embodiments of the invention can be made without departing from the spirit and scope of the invention, the invention resides in the claims hereinafter appended.

We claim:

1. A fiber distribution hub comprising:
   a cabinet having a front and a rear, the cabinet including at least a first front door for accessing an interior of the cabinet from the front of the cabinet;
   a termination region positioned within the interior of the cabinet, the termination region including a front side that faces toward the front of the cabinet and a rear side that faces toward the rear of the cabinet, the termination region defining at least one opening;
   at least one termination module mounted at the at least one opening defined by the termination region, the termination module including a support carrying a plurality of termination adapters; each termination module including a support carrying a plurality of termination adapters, each termination adapter having a first side and a second side;
   a splitter arranged at a splitter region positioned within the interior of the cabinet, the splitter being configured to receive an optical signal, split the optical signal into a plurality of optical signals, and to output the optical signals to a plurality of splitter pigtails terminated by first fiber optic connectors coupled to the first sides of the termination adapters carried by the support of the termination module;
   a plurality of intermediate fibers having first ends terminated by second fiber optic connectors coupled to the second sides of the termination adapters and second ends at which a multi-fiber connector is mounted; and
   a multi-fiber connector adapter configured to receive the multi-fiber connector, the multi-fiber connector adapter being located at the cabinet.

2. The fiber distribution hub of claim 1, further comprising a bulkhead positioned within the interior of the cabinet, the termination region being located on the bulkhead.

3. The fiber distribution hub of claim 2, further comprising:
   a storage region position on the bulkhead within the interior of the cabinet, the storage region configured to receive at least one storage module.

4. The fiber distribution hub of claim 2, wherein labeling is provided on the bulkhead adjacent the at least one opening of the termination region.

5. The fiber distribution hub of claim 1, wherein the at least one opening of the termination region includes a plurality of spaced-apart, elongated slots.

6. The fiber distribution hub of claim 1, wherein the plurality of termination adapters includes twelve termination adapters arranged in a row.

7. The fiber distribution hub of claim 2, wherein the bulkhead is part of a swing frame that is pivotally mounted within the interior of the cabinet.

8. The fiber distribution hub of claim 1, further comprising at least one cable interface, the cable interface being configured to receive the multi-fiber connector mounted at the second ends of the intermediate fibers.

9. The fiber distribution hub of claim 8, wherein the cable interface includes at least one fiber optic adapter.

10. The fiber distribution hub of claim 8, wherein the at least one termination module includes a plurality of termination modules, each termination module including a plurality of termination adapters retaining fiber optic connectors, each fiber optic connector being optically coupled to an intermediate fiber extending from the connector, the intermediate fibers of each termination module being terminated by a corresponding multi-fiber connector.

11. The fiber distribution hub of claim 10, wherein the cable interface includes a plurality of fiber optic adapters, each fiber optic adapter extending from a front to a rear, the front of each fiber optic adapter being configured to receive one of the multi-fiber connectors terminating the intermediate fibers of the termination modules.

12. The fiber distribution hub of claim 1, further comprising a termination shelf extending rearwardly from the termination region, the termination shelf providing cable management of the intermediate fibers.

13. The fiber distribution hub of claim 8, wherein the cable interface is a panel retaining at least one termination adapter.

14. The fiber distribution hub of claim 1, wherein the termination module is configured to be installed in the opening defined by the termination region from a rear of the termination region.

15. The fiber distribution hub of claim 1, wherein the termination module includes a latch.

16. A fiber distribution hub comprising:
   a cabinet defining an interior and including at least a first door for accessing the interior;
   a splitter region positioned within the interior of the cabinet;
   at least one splitter module mounted within the cabinet at the splitter region, the splitter module being configured to split a feeder signal into a plurality of output signals, the output signals being carried by pigtails that extend away from the splitter module;
   a termination region positioned within the interior of the cabinet, the termination region including a first side and a second side, the termination region defining at least one opening;
   at least one termination module mounted within the at least one opening defined by the termination region, the termination module including an adapter mounting member to which a plurality of termination adapters are mounted, each termination adapter being configured to receive and optically couple fiber optic connectors from the first and second sides of the termination region, wherein the fiber optic connectors received at the first side of the termination region terminate the pigtails output from the splitter module;
   a plurality of intermediate fibers extending between first and second ends, the first ends of the intermediate fibers being terminated at the connectors plugged into the termination adapters at the second side of the termination region to optically couple the intermediate fibers to the pigtails, the second ends of the intermediate fibers being terminated by a first multi-fiber connector; and
   a multi-fiber connector adapter configured to receive the multi-fiber connector, the multi-fiber connector adapter being located at the cabinet.

17. The fiber distribution hub of claim 16, further comprising a storage region position within the interior of the cabinet, the storage region configured to receive at least one storage module.

18. The fiber distribution hub of claim 16, wherein the termination region and the splitter region are mounted to a swing frame that is pivotally mounted within the interior of the cabinet.

19. The fiber distribution hub of claim 16, wherein the at least one termination module includes a plurality of termination modules, each termination module including a plurality of termination adapters retaining fiber optic connectors, each fiber optic connector being optically coupled to an intermediate fiber extending from the connector, the intermediate fibers of each termination module being terminated by a corresponding multi-fiber connector.

20. The fiber distribution hub of claim 16, wherein the termination module includes a latch.

21. The fiber distribution hub of claim 16, further comprising a plurality of outgoing fibers that exit the cabinet, the outgoing fibers being terminated by a second multi-fiber connector adapted to interconnect with the first multi-fiber connector.

22. A fiber distribution hub comprising:
a cabinet defining an interior and including at least a first door for accessing the interior;
a splitter region positioned within the interior of the cabinet;
at least one splitter module mounted within the cabinet at the splitter region, the splitter module configured to split a feeder signal into a plurality of output signals, the output signals being carried by pigtails that extend away from the splitter module, the pigtails having connectorized ends;
a termination region positioned within the interior of the cabinet;
x termination adapters carried by a termination module configured such that the x termination adapters can be mounted at the termination region as a unit; the termination adapters each being configured to couple two fiber optic connectors together;
x intermediate fibers having first and second ends, the first ends terminating at x fiber optic connectors received within the x termination adapters, the second ends of the x intermediate fibers terminating at a single multi-fiber connector;
wherein the termination adapters allow the pigtails of the splitter module to be optically connected to the intermediate fibers; and
a multi-fiber connector adapter configured to receive the multi-fiber connector, the multi-fiber connector adapted being located at the cabinet.

23. The fiber distribution hub of claim 22, wherein x equals 12.

24. A fiber distribution hub comprising:
a cabinet having a door for accessing an interior of the cabinet;
a termination region positioned within the interior of the cabinet, the termination region including a plurality of termination adapters, each termination adapter having a first end and a second end;
a connector storage location positioned within the interior of the cabinet;
a splitter module mounted at a splitter region positioned within the interior of the cabinet, the splitter module including a splitter configured to receive an optical signal, to split the optical signal into a plurality of optical signals, and to output the optical signals to a plurality of splitter pigtails terminated by first fiber optic connectors that are configured to be received at either the first ends of the termination adapters or the connector storage location;
a plurality of intermediate fibers having first ends and second ends, the first ends of the intermediate fibers being terminated by second fiber optic connectors received at the second ends of the termination adapters, the second ends of the intermediate fibers being terminated at a multi-fiber connector;
a multi-fiber connector adapter configured to receive the multi-fiber connector, the multi-fiber connector adapter being located at the cabinet; and
a distribution cable routed to subscriber locations, the distribution cable including fibers coupled to a second multi-fiber connector inserted into the multi-fiber adapter.

* * * * *